Oct. 4, 1949.　　　　C. J. GODFREY　　　　2,483,897
OPTICAL PRECISION GAUGE
Filed Feb. 26, 1946

Inventor
C. J. Godfrey

Patented Oct. 4, 1949

2,483,897

UNITED STATES PATENT OFFICE 2,483,897

OPTICAL PRECISION GAUGE

Charles John Godfrey, London, England, assignor, by mesne assignments, to Hilger & Watts Limited, London, England Application February 26, 1946, Serial No. 650,255
In Great Britain March 1, 1945

6 Claims. (Cl. 88—39)

This invention relates to a precision gauge of the optical type as employed on drilling and milling machines, small jig bores and centre lathes to enable adjustments to be effected to counter-act spindle "run-out."

The invention has for its object to provide an improved optical gauge of the above character.

According to the invention an optical gauge having a main casing and a laterally projecting branch casing both housing a lens system similar to that employed in a microscope, with the objective lens system located at one end of the main casing and the eyepiece located at the outer end of the branch casing, is provided wherein the main casing is provided with a fixed reflecting mirror by which the line of sight is bent along the branch casing to enable observation of the object to be made through the said eyepiece and the branch casing includes a refractor which is adjustable to permit adjustments of the line of sight to be made.

The refractor is mounted within the branch casing so as to be capable of partaking of a tilting movement therein to effect the desired adjustment and means is provided whereby such adjustment can be effected in two directions substantially at right angles to one another.

Thus in accordance with the invention the angle at the reflector between the two lines of sight (i. e. that along the main casing and that along the branch casing) remains unchanged and the required adjustment is effected by displacing the image by tilting the refractor, the effect of which is to displace a beam of light parallel to its original direction, the amount of displacement being proportional to the angle of tilt and the thickness and refractive index of the refractor.

Figure 1:
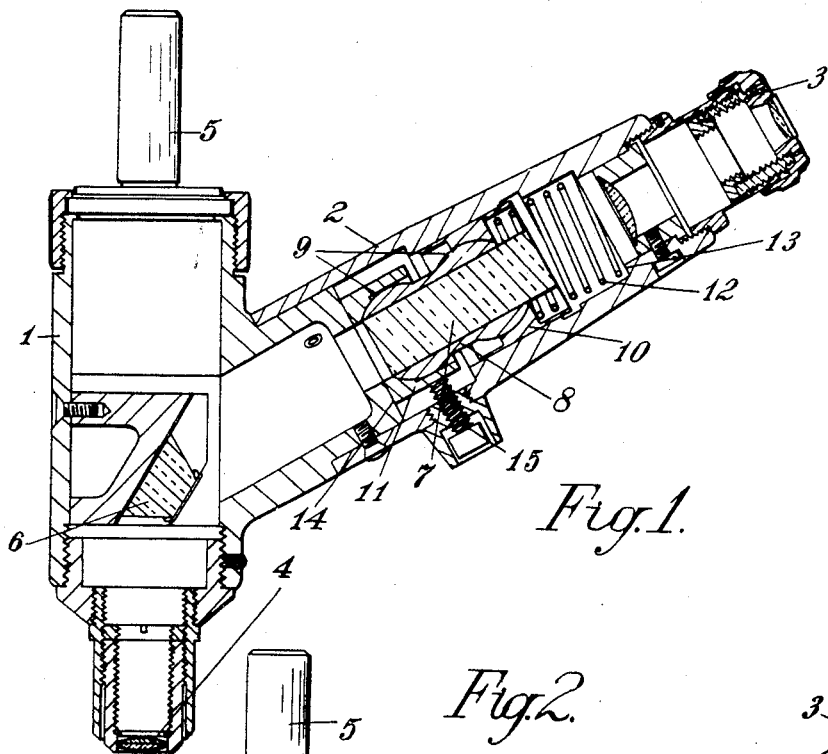
Figure 2:
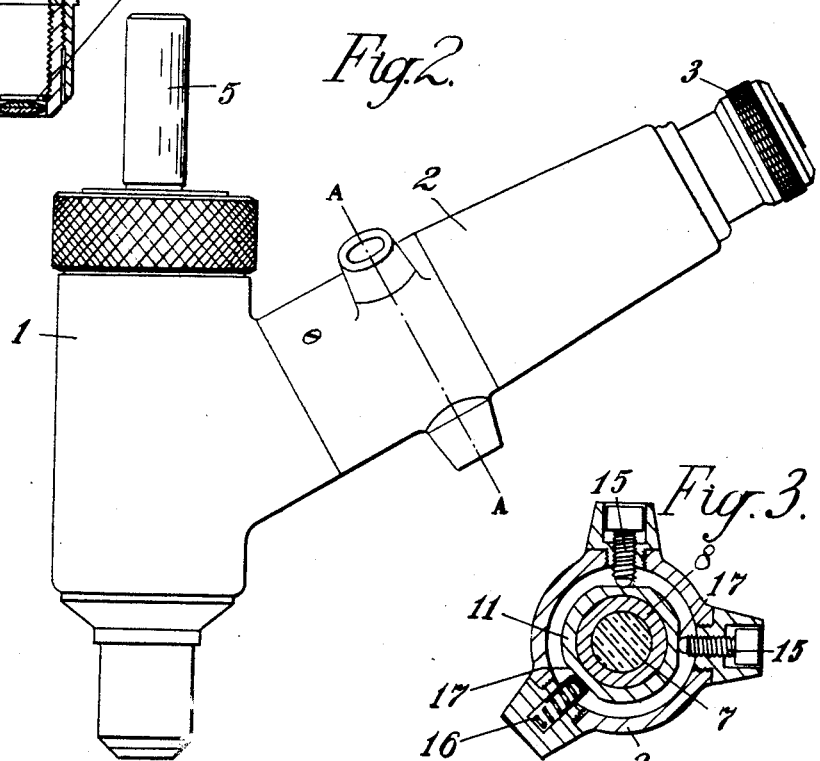
Figure 3:
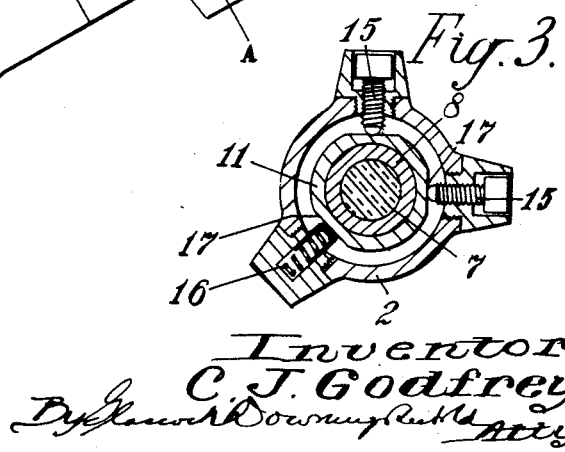

In the accompanying drawings:

Figure 1 is a vertical section through a gauge in accordance with the invention, Figure 2 is an elevational view of this gauge, and Figure 3 is a cross section on the line A—A of Figure 2.

In carrying the invention into effect in one convenient manner as illustrated in the drawings an optical gauge is provided comprising a main cylindrical casing 1 from one side of which there extends a branch cylindrical casing 2 having its longitudinal axis inclined with respect to the central longitudinal axis of the main casing such that the two axes form an obtuse angle where they intersect within the main casing and this with respect to a viewing eye-piece 3 fitted at the outer end of the branch casing and an objective lens system 4 fitted at one end of the main casing, the latter at its opposite end carrying a central outwardly projecting spindle 5 capable of being held in a chuck (not shown) so that rotation of the chuck will cause rotation of the main and branch casings as a whole.

The optical elements employed in the gauge are similar to those normally employed in a microscope but in the gauge the optical axis is bent by the introduction of a prism reflector 6 which enables the object to be observed through the eyepiece in a laterally dispaced position with regard to the original line of sight and thereby permits the use of this lateral observation point when the gauge is set-up in the chuck of a jig borer or other machine.

The prism reflector 6 is fixed in a stationary position within the main cylindrical casing so that there is no change in the angle between the two lines of sight i. e. the original line of sight through the objective lens system and the bent line of sight at the reflector but an adjustment of the line of sight is possible in two directions substantially at right angles to one another by the tilting of a parallel glass plate refractor 7 interposed in the branch casing between the prism and the lens system of the eyepiece, the tilting of this refractor displacing a beam of light parallel to its original direction and the amount of displacement being proportional to the angle of tilt and the thickness and refractive index of the refractor block 7.

The refractor block may conveniently consist of a rod or block of glass having parallel end walls and rigidly mounted in a sleeve 8 which has two axially spaced spherical bearing surfaces 9 on its outer periphery one of which is seated in a correspondingly shaped recess in a transversely immovable ring member 10 mounted within the branch casing and the other of which spherical bearing surfaces is seated in a correspondingly shaped recess in another ring member 11 which however is capable of partaking of transverse movement within the branch casing in a plane perpendicular to the central longitudnial axis of this casing part.

The transversely immovable ring 10 lies nearest the eyepiece and is engaged by the inner end of a helical compression spring 12 mounted within the branch casing so as to be co-axial therewith and the outer end of which spring bears against a ledge 13 in the branch casing adjacent the inner end of the eyepiece lens system. This spring imposes a force upon the refractor assembly, (constituted by the refractor itself and the sleeve and rings) which maintains the inner and transversely movable ring 11 in contact with a radial fixed ledge 14 on the interior of the branch casing and across which ledge the inner ring is slidable when the adjustments referred to are effected.

These adjustments are capable of being effected by the actuation of either of two screws 15 passed transversely through screw-threaded openings in the branch casing and engageable at their inner ends with the outer periphery of the inner and transversely movable ring 11 above mentioned. These screws extend perpendicularly to the central longitudinal axis of the branch casing and are disposed substantially at right angles to one another as shown in Figure 3. The inner ends of these screws, therefore, provide a two-point contact with the outer periphery at the said ring 11; a third point of contact is constituted by the inner end of a spring biassed plunger 16 mounted also in the branch casing and engaging the outer periphery of the ring 11. Where the inner ends of the screws 15 and the inner end of the spring biassed plunger 16 engage the outer periphery of the ring 11 the latter is preferably formed with "flats" 17.

The arrangement is such that the refractor block 7 can be tilted within the branch casing by adjustment of one or the other of the said screws 15 to produce a tilting movement of the refractor sleeve about its spherical bearing surfaces. This tilting movement is accompanied by a sliding movement of the inner ring 11 across the fixed ledge 14 and against the influence of the spring biassed plunger 16.

The gauging tool may be employed for such operations as centering, truing, laying-out, inspecting, testing and measuring in machine shop practice and in other fields also.

I claim:

1. An optical gauge comprising a main casing and a laterally projecting branch casing, an objective lens system located at one end of the main casing, an eyepiece located at the outer end of the branch casing, a fixed reflector in the main casing by which the line of sight is bent along the branch casing to enable observation of the object to be made through the said eyepiece, a refractor movably mounted in the branch casing, a sleeve receiving said refractor, two axially spaced spherical bearing surfaces on the sleeve, a transversely immovable ring member mounted within the branch casing and having a recess receiving one of said bearing surfaces, a second ring member having a recess receiving the other bearing surface and mounted for transverse movement within the branch casing in a plane perpendicular to the central longitudinal axis of this casing part, and means for transversely adjusting the second ring member in the branch casing whereby the line of sight may be shifted laterally with respect to its optical axis.

2. An optical gauge is claimed in claim 1 wherein the branch casing is provided with a radial ledge engaged by the second ring member and spring means maintaining the second ring member in engagement with said ledge.

3. An optical gauge as claimed in claim 1 wherein said adjusting means includes two screws threaded in the branch casing and engaging the second ring member.

4. An optical gauge as claimed in claim 1 wherein said adjusting means includes screws threaded in the branch casing and engaging the second ring member at spaced points, and a spring biased plunger in the casing engaging the second ring member at another point.

5. An optical gauge comprising a main casing and a laterally projecting branch casing, an objective lens system located at one end of the main casing, an eyepiece located at the outer end of the branch casing, a fixed reflector in the main casing by which the line of sight is bent along the branch casing to enable observation of the object to be made through said eyepiece, a refractor supported in the casing for movement about axes lying in a plane perpendicular to the line of sight, first adjustment means for tilting the refractor about a first axis at right angles to the line of sight, second adjustment means for tilting the refractor about a second axis at right angles to said first axis to the line of sight whereby the line of sight may be shifted laterally with respect to the optical axis along straight paths, the lateral shift accomplished by the first adjustment means being unaffected by operation of the second adjustment means.

6. An optical precision gauge comprising a main casing and a laterally projecting branch casing arranged at an inclination to one another, an objective lens system at one end of the main casing and an eyepiece lens system at the end of the branch casing, a fixed reflector by which the line of sight is bent along the branch casing to enable observation of the object to be made through said eyepiece, a refractor in the branch casing, and pivotal support means including first and second adjustment means each of which tilts the refractor about an axis normal to the line of sight to effect lateral shifting of the line of sight along straight paths normal to the optical axis.

CHARLES JOHN GODFREY.

REFERENCES CITED

The following references are of record in the file of this patent:

UNITED STATES PATENTS

| Number | Name | Date |
|---|---|---|
| 588,094 | Searle et al. | Aug. 10, 1897 |
| 1,208,490 | Comstock | Dec. 12, 1916 |
| 2,064,145 | Bonneau | Dec. 15, 1936 |
| 2,146,906 | Moller | Feb. 14, 1939 |
| 2,166,101 | Moller | July 11, 1939 |
| 2,233,441 | Whittaker | Mar. 4, 1941 |
| 2,360,221 | Gradisar | Oct. 10, 1944 |

FOREIGN PATENTS

| Number | Country | Date |
|---|---|---|
| 173,512 | Great Britain | Aug. 17, 1922 |
| 153,231 | Switzerland | June 1, 1932 |
| 410,050 | Great Britain | May 10, 1934 |
| 679,131 | Germany | July 29, 1939 |
| 559,851 | Great Britain | Mar. 8, 1944 |